May 16, 1933.   O. A. WIBERG   1,908,804
SHAFT PACKING
Filed Oct. 3, 1929   2 Sheets-Sheet 1
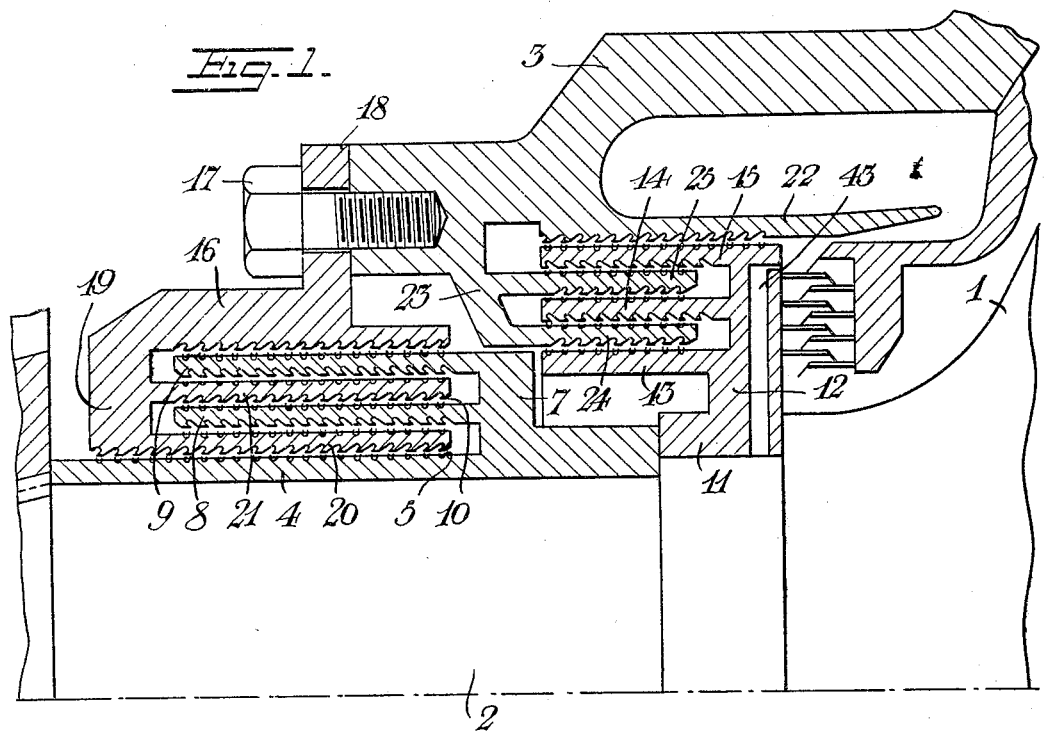
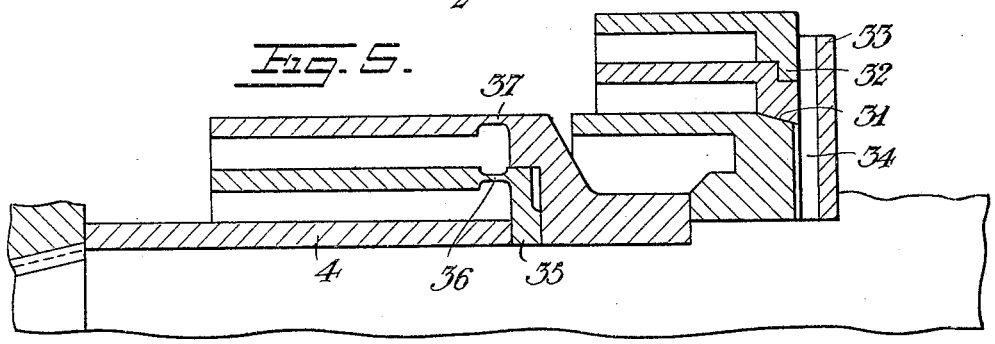
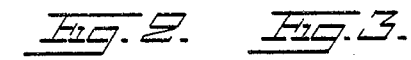 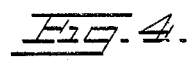
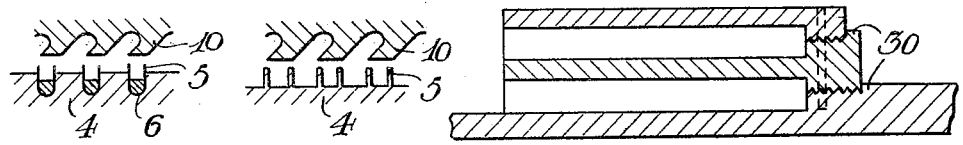
Inventor
Oscar Anton Wiberg
by Henry Orth Jr.
Atty

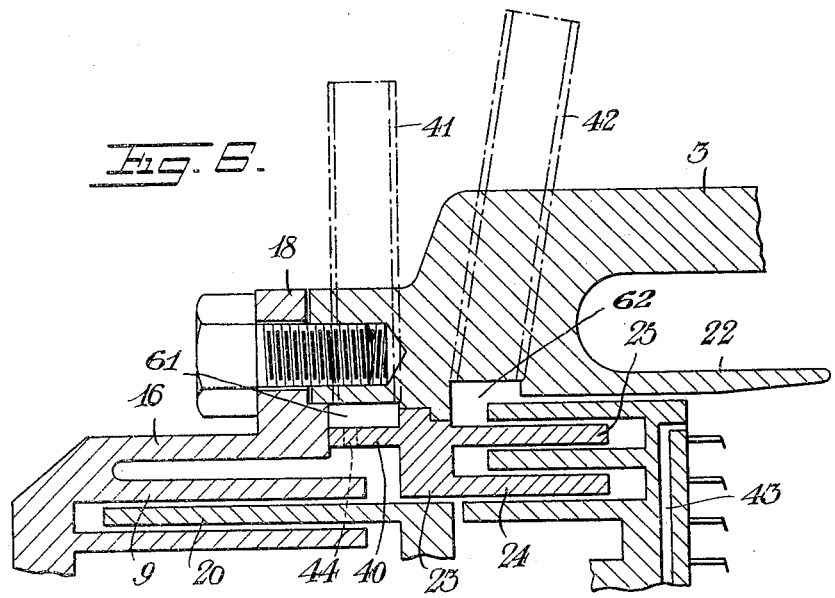
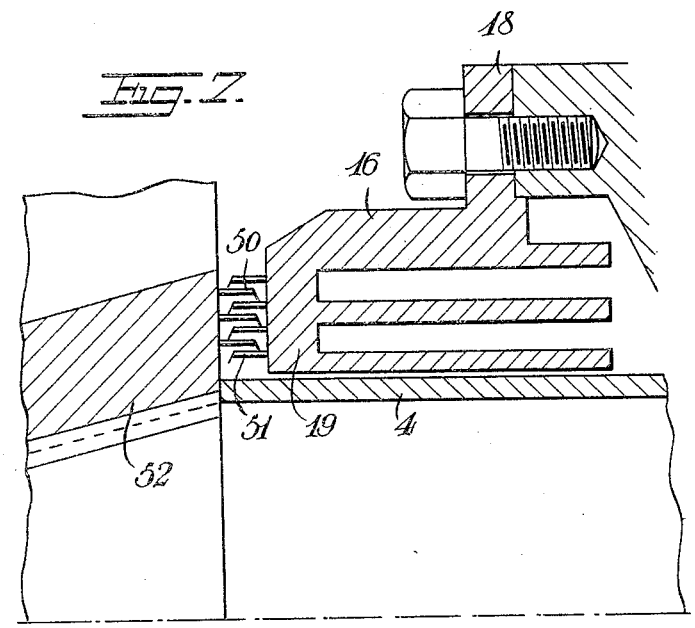

Patented May 16, 1933

1,908,804

UNITED STATES PATENT OFFICE

OSCAR ANTON WIBERG, OF FINSPONG, SWEDEN

SHAFT PACKING

Application filed October 3, 1929, Serial No. 397,101, and in Great Britain November 5, 1928.

This invention relates to packings for preventing the leakage of elastic fluid between two concentric elements which rotate relatively to each other.

In order to prevent such leakage it has been already proposed to use labyrinth packings consisting of a plurality of concentric sleeves having teeth on their adjacent surfaces, some of which teeth may slope towards the escaping elastic fluid.

When such a packing is used in connection with elastic fluid turbines the said sleeves are carried alternately by the turbine shaft and by the steam chest which surrounds the packing as a casing or housing. Certain difficulties have been experienced in assembling or mounting the packings for such use. These difficulties are due to the fact that each individual sleeve must be inserted in its place separately after the shaft end has been already brought to its definite position relatively to the steam chest. The dismantling of the packing is really somewhat easier inasmuch as the shaft end may, generally, be drawn out directly thus releasing it from all of the respective packing elements. In assembling, however, the key-slots will prevent direct insertion of the shaft end.

The object of this invention is to make both the mounting and dismantling of shaft packings of the above said kind easier and simpler. To this end the said sleeves are so dimensioned and arranged relatively to each other that those sleeves carried by one of the concentric relatively rotating elements may be freely inserted into and withdrawn from the sleeves carried by the other element by an axial relative displacement of said two elements with respect to each other.

In the accompanying drawings several embodiments of the invention are illustrated as applied to an elastic fluid turbine.

Fig. 1 is an axial section through part of a packing according to the invention.

Figs. 2 and 3 are sectional detail views showing the design of the teeth of the packing elements.

Figs. 4 and 5 are axial sections of packing elements of modified designs.

Fig. 6 illustrates a still further method of subdividing the sleeves.

Figure 7 illustrates a further embodiment.

With reference to Fig. 1, the numeral 1 indicates the turbine shaft the reduced end 2 of which carries the rotating part of the packing. 3 indicates the steam chest which carries the stationary parts of the packing and surrounds the packing as a casing or housing. The rotating part of the packing comprises a sleeve 4 fixed on the shaft end 2, and provided on its outer surface with pairs of radially projecting annular packing teeth 5. Said packing teeth may either comprise sheet metal rings of U shaped section, as shown in Fig. 2, which fit in annular grooves formed in the outer surface of sleeve 4 and firmly held therein by means of sealing rings 6, or be formed integral with sleeve 4, as shown in Fig. 3. Sleeve 4 is provided with a radially extending flange 7 which carries two cylindrical sleeves 8 and 9 provided with radially projecting packing teeth on their outer surface and angularly projecting packing teeth 10 on their inner surface, the teeth 10 sloping in a direction opposite to that in which the leakage steam flows. The design of the packing teeth 10 is more clearly shown in Figs. 2 and 3. At the outer end of sleeve 4 is a short sleeve 11 fixed to shaft end 2 which is provided with a radially extending flange 12. Said flange 12 carries an inner cylindrical sleeve 13 having radial packing teeth on its outer surface, and two outer cylindrical sleeves 14 and 15 provided with radial packing teeth on their outer surface and angularly projecting packing teeth on their inner surface.

The stationary part of the packing comprises a shell 16 secured to the inner end surface of the steam chest 3 by means of screws 17 extending through holes formed in an outwardly projecting annular flange 18 of shell 16 and engaging threaded borings in said inner end surface of the steam chest. Shell 16 is provided with an inwardly extending flange 19 which carries two cylindrical packing sleeves 20 and 21 projecting into the spaces between sleeves 4, 8 and 8, 9, respectively. The packing sleeves 20 and 21 are provided with angularly projecting annular packing teeth on their inner surface and radially projecting annular packing teeth on their outer surface.

Formed integral with steam chest 3 is a shell 22 having angularly projecting packing teeth on its inner surface. Sleeve 22 surrounds concentrically the rotary packing sleeve 15. Likewise integral with the steam chest 3 is an inwardly extending flange 23 carrying two cylindrical packing sleeves 24 and 25 of which the former projects into the space between sleeves 13 and 14 and the latter projects into the space between sleeves 14 and 15.

As shown, the packing elements form two groups, viz. one inner group comprising sleeves 4, 20, 8, 21, 9 and shell 16, and one outer group comprising sleeves 13, 24, 14, 25, 15 and shell 22. The inner diameter of the shell 16 of the inner group is substantially equal to the inner diameter of the innermost sleeve 24 of the outer group and the spaces between the various stationary packing sleeves open all outwardly so that shaft 1 may be inserted in its place after all of the rotary packing sleeves have been fixed to shaft end 2 and with the stationary packing sleeves fixed on their respective places. Likewise, the shaft may be removed with all of the respective packing elements fixed thereto. It is thus evident that the assembling and dismantling of the packing may take place in a most simple and easy way.

In order to allow any steam that may leak along shaft end 2 to pass to the leakage chamber a passage 43 is shown in flange 12.

In Fig. 1 the stationary packing sleeves of each group are shown as formed integral with each other. Similarly, the rotary packing sleeves of each group are shown as formed integral with each other. As some difficulties may be experienced in manufacturing the sleeves integral with each other in the manner shown in Fig. 1, the sleeves may also be manufactured separately and screwed together, as shown in Fig. 4, and keyed in their relative positions by well known locking means. In order to determine the relative position of the sleeves in axial direction each inner sleeve may be provided with an outwardly projecting shoulder, as shown at 30 in Fig. 4.

In Fig. 5 other methods of fixing separately manufactured sleeves to each are shown. Thus, for instance, the sleeves may be formed with conical engaging surfaces, as shown at 31, or with cylindrical engaging surfaces, having a groove out in one surface to be engaged by a corresponding flange on the other surface for centering purposes, as shown at 32. The sleeves are in this case held in place by an annular disk 33 having radial grooves 34. According to a further method one sleeve may be formed with a radial base flange fitting in a corresponding groove in the adjacent sleeve or its supporting flange, as shown at 35.

The innermost sleeve 4 of the packing fixed to the shaft end 2 may be threaded on said end so that it may serve both as locking and packing element, or there may be used a separate lock nut.

At 36 and 37, Fig. 5, the section of the sleeves is reduced to render the sleeves more flexible.

In order to allow the sleeves to expand freely in axial direction due to heat, flexible discs may be inserted there between at suitable points.

In Fig. 6 like references are used for similar parts as in Fig. 1. As shown in Fig. 6 the inwardly extending flange 23 with its sleeves 24 and 25 is not formed integrally with the steam chest 3 but is formed separately and attached thereto in any suitable way. The flange 23 is formed with a sleeve shaped projection 40 at the side opposite to that from which the sleeves 24 and 25 project. In Fig. 6 there is also indicated a suitable way in which to arrange shaft leak off pipe 41 and pipe for sealing steam 42. As shown, there are provided chambers, 61 and 62, in communication with the outermost sleeve of the two sets of packing sleeves. The chamber 61 communicates with said sleeve by apertures 44 formed in the sleeve-shaped projection 40, whereas the chamber 62 is formed by an enlargement of the space adapted to receive the outermost sleeve of the respective rotary set of sleeves. The pipe 41 is connected to chamber 61 and pipe 42 is connected to chamber 62.

What I claim is:

1. A shaft packing comprising, in combination with a rotary element and a surrounding stationary element, at least two axially displaced sets of concentric packing sleeves carried by said stationary element, means to connect one of said sets to said stationary element, projections on the other set to engage said stationary element and said first-mentioned set in such a way as to be clamped therebetween due to the attaching of said first-mentioned set to said stationary element, said sets being situated within different radial ranges and all with their packing sleeves open to the same side, and at least two axially displaced sets of concentric packing sleeves carried by said rotary element in such a way as to allow their being brought into and out of engagement with the sleeves of a stationary set by a relative axial movement of said elements.

2. A shaft packing comprising, in combination with a rotary element and a surrounding stationary element, at least two axially displaced sets of concentric packing sleeves carried by said stationary element, means to connect one of said sets to said stationary element, projections on the other set to engage said stationary element and said first-mentioned set in such a way as to be clamped therebetween due to the attaching of the first-mentioned set to said stationary element with the various sets situated within different radial ranges and all with their packing sleeves open to the same side, separate chambers in said stationary element in communication with the outermost sleeve of the separate sets, means to withdraw fluid from said chambers or admit fluid thereto, and at least two axially displaced sets of concentric packing sleeves carried by said rotary element in such a way as to allow their being brought into and out of engagement with the sleeves of the stationary sets by a relative axial movement of said elements.

In testimony whereof I have signed my name.

OSCAR ANTON WIBERG.